United States Patent [19]

Nishizaki

[11] 4,080,046
[45] Mar. 21, 1978

[54] FIELD-EFFECT MODE LIQUID CRYSTAL DISPLAY DISPLAYING IMAGES IN COMPLEMENTARY COLORS

[75] Inventor: Masashi Nishizaki, Tenri, Japan

[73] Assignee: Sharp Kabushiki Kaisha, Osaka, Japan

[21] Appl. No.: 689,659

[22] Filed: May 24, 1976

[30] Foreign Application Priority Data

May 26, 1975 Japan ............................ 50-63156
Jun. 25, 1975 Japan ............................ 50-90364

[51] Int. Cl.$^2$ ............................................. G02F 1/13
[52] U.S. Cl. .................................... 350/347; 350/158; 350/337
[58] Field of Search ................... 350/160 LC, 150, 158

[56] References Cited

U.S. PATENT DOCUMENTS 2,423,371  7/1947  Carranza ................................ 350/158

OTHER PUBLICATIONS

Scheffer: "New Multicolor Liquid Crystal Displays That Use a Twisted Nematic Electro-Optical Cell," J. App. Phys., vol. 44, pp. 4799–4803, Nov., 1973.

*Primary Examiner*—Edward S. Bauer
*Attorney, Agent, or Firm*—Birch, Stewart, Kolasch & Birch

[57] ABSTRACT

In combination with a field-effect mode liquid crystal display which comprises a pair of polarizers and a field-effect mode liquid crystal display cell containing a liquid crystal composition having positive dielectric anisotropy characteristics, a retardation plate is placed between the liquid crystal display cell and one of the polarizers. The retardation plate creates phase differences of discriminative degrees in dependence on the differences of the wave length of the light passing therethrough. The images appear in one color on the complementary color background.

7 Claims, 10 Drawing Figures

FIELD-EFFECT MODE LIQUID CRYSTAL DISPLAY DISPLAYING IMAGES IN COMPLEMENTARY COLORS

BACKGROUND AND SUMMARY OF THE INVENTION

The present invention relates to a field-effect mode liquid crystal display and, more particularly, to a field-effect mode liquid crystal display which can display colored images.

In the conventional field-effect mode liquid crystal display, a liquid crystal cell containing a liquid crystal composition having positive dielectric anisotropy characteristics, is placed between cross-polarizers, whereby the unactivated cell can be made to transmit light. When a liquid crystal display cell of this type is activated by applying a potential thereacross, the ability of the liquid crystal to rotate the plane of polarization is destroyed and the cell appears dark or opaque since the incident light is blocked by the analyzer.

On the other hand, the display can be constructed so as to normally block light until activated. The result is essentially the same except that images appear white on a black background rather than vice versa as is the case when the display transmits light when unactivated.

When polarizers accompany a color filtering characteristic, a colored image appears on the above-mentioned field-effect mode liquid crystal display. However, the image is colored only on its clear portion and the black portion still remains black. Moreover, the images are colored in a predetermined color, and multicolored images can not be obtained.

Accordingly, an object of the present invention is to provide a field-effect mode liquid crystal display which can produce colored images.

Another object of the present invention is to provide a field-effect mode liquid crystal display wherein images appear in one color on a complementary color background.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objectives, pursuant to an embodiment of the present invention, a retardation plate is placed between a liquid crystal display cell containing a liquid crystal composition having positive dielectric anisotropy characteristics and one of a pair of polarizers. The retardation plate creates phase differences of discriminative degrees in dependence on the differences of the wave length of the light passing therethrough. With such an arrangement, the images appear in one color on the complementary color background.

In a preferred form, the retardation plate is corrugated, thereby displaying images in a plurality of pairs of complementary colors.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figure 1:
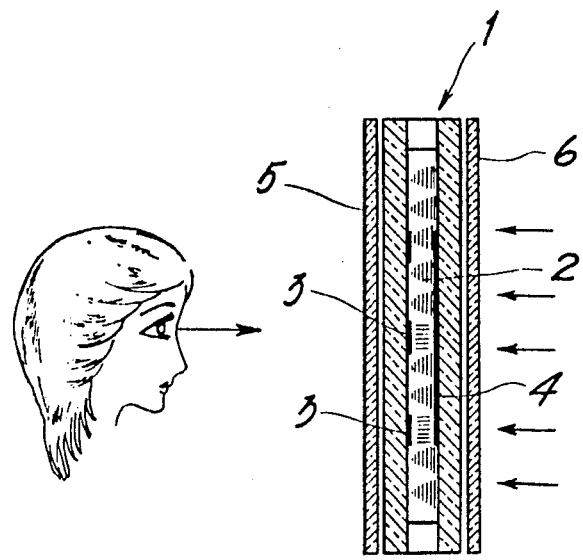
FIG. 1 is a cross-sectional view of a field-effect mode liquid crystal display of the prior art.

Referring now to the drawings, and to facilitate an understanding of the present invention, the prior art field-effect mode liquid crystal display will be first described with reference to FIG. 1.

A field-effect mode liquid crystal display cell 1 includes a liquid crystal layer 2 which exhibits a molecular alignment of a twisted nematic construction having a twist angle of 90° when an electric field is not applied across the liquid crystal composition. When the field-effect mode liquid crystal display cell 1 of this type is activated by applying a potential thereacross through the use of transparent segment electrodes 3 and a transparent common electrode 4, the ability of the liquid crystal to rotate the plane of polarization is destroyed. The liquid crystal cell 1 is interposed between a pair of first and second polarizers 5 and 6, the plane of polarization of the polarizers 5 and 6 crossing each other at a right angle.

The images appear black on a white background at selected portions through the use of the segment electrodes 3. On the other hand, the display can be constructed so as to normally block light until activated. The result is essentially the same except that images appear white on a black background rather than vice versa as is the case when the display transmits light when activated.

Figure 2:
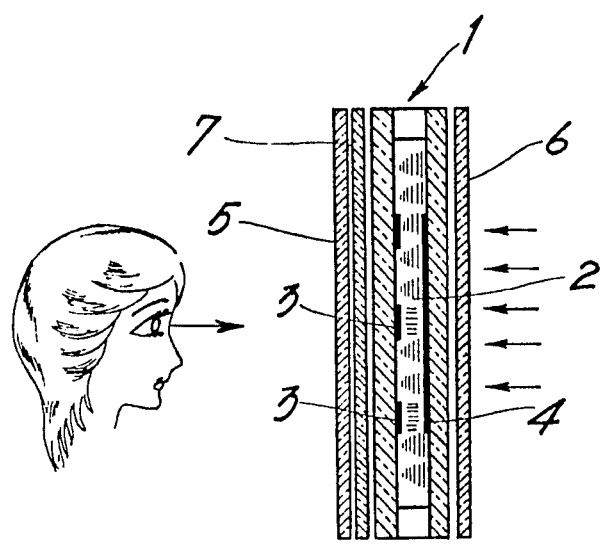
FIG. 2 is a cross-sectional view of an embodiment of a field-effect mode liquid crystal display of the present invention.

FIG. 2 shows an embodiment of a field-effect mode liquid crystal display of the present invention. Like elements corresponding to those of FIG. 1 are indicated by like numerals.

A retardation plate 7 is disposed between the first linear polarizer 5 and the liquid crystal display cell 1. The retardation plate 7, or, a phase plate functions to convert linearly polarized light into any one of circularly polarized light, elliptically polarized light and linearly polarized light. In general, the phase plate determines two axes on its surface, the two axes crossing each other at a right angle. When the natural light is introduced perpendicularly into the phase plate, the introduced light is divided into two linearly polarized light beams of which planes of the polarization are parallel to the above-mentioned two axes, respectively. Moreover, the phase plate determines two different wave velocities, or, two different indexes of refraction for each of the polarized light. Therefore, when the linearly polarized light is introduced perpendicularly to the phase plate, two different linearly polarized light beams pass through the phase plate, and the phase plate develops elliptically polarized light because the divided two linearly polarized light rays create a phase difference $\delta$ to each other. The above-mentioned phase difference $\delta$ can be expressed as follows:

$$\delta = (2\pi/\lambda)(n_1 - n_2)t \qquad (1)$$

where:

$\lambda$ is the wave length of the incident light;

$n_1$ and $n_2$ are indexes of refraction of the respective linearly polarized light rays passing through the phase plate; and $t$ is the thickness of the phase plate.

When the incident linearly polarized light has a plane of polarization parallel to one of the axes determined by the phase plate, no phase difference is created. In general, the 90 degree phase plate and the 180 degree phase plate on sale can create a substantially uniform phase difference even though the wave length of the incident light varies within the visible region. However, the retardation plate used in this invention creates different phase differences $\delta$ when the wave length $\lambda$ of the incident light varies even within the visible region.

The retardation plate 7 can be made of a transparent plastic film or cellophane such as a biaxially oriented polyester film or a biaxially oriented polypropylene film. The most preferable material for the retardation plate 7 of the present invention is the biaxially oriented polyester film (Mitsubishi DIAFOIL manufactured by Mitsubishi Plastics Industries, Limited, Japan). The preferred thickness of the DIAFOIL is about 16μm and about 25μm. Another preferred film for the retardation plate 7 is the biaxially oriented polypropylene film (TORYFAN BO manufactured by Toray Industries Inc., Japan) of thickness of 20μm to 60μm and, especially, thickness of about 60μm.

Figure 3:
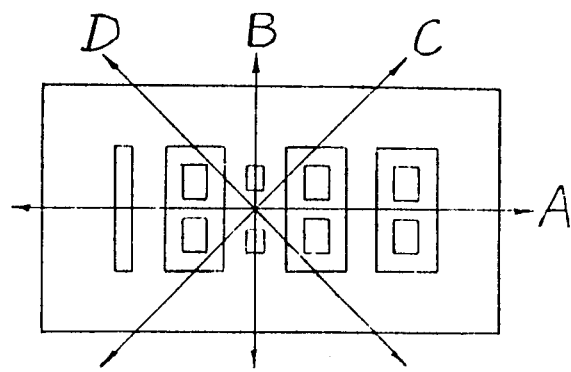
FIG. 3 is a front view of the field-effect mode liquid crystal display of FIG. 2.
Figure 4A:
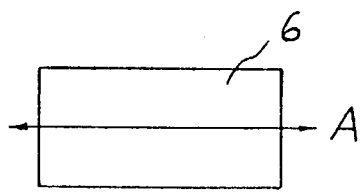
FIG. 4(a) is a front view of a first polarizer included within the field-effect mode liquid crystal display of FIG. 2.
Figure 4B:
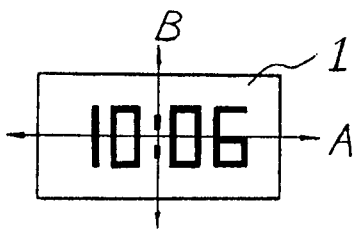
FIG. 4(b) is a front view of a liquid crystal display cell included within the field-effect mode liquid crystal display of FIG. 2.
Figure 4C:
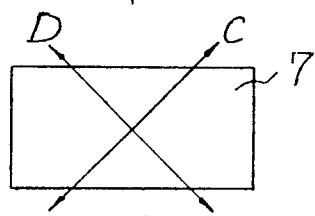
FIG. 4(c) is a front view of a retardation plate included within the field-effect mode liquid crystal display of FIG. 2.
Figure 4D:
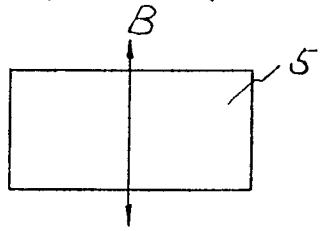
FIG. 4(d) is a front view of a second polarizer included within the field-effect mode liquid crystal display of FIG. 3.

FIG. 3 shows the field-effect mode liquid crystal display of the present invention seen from the operator's side.

Now assume that the liquid crystal molecule is aligned in the direction A at the surface of the liquid crystal layer 2 adjacent to the second linear polarizer 6, the direction A being identical with the plane of the polarization of the second linear polarizer 6. The liquid crystal molecule is aligned in the direction B at the other surface of the liquid crystal layer 2 adjacent to the first linear polarizer 5, the direction B being identical with the plane of the polarization of the first linear polarizer 5. The planes of the polarization of the polarizers 5 and 6 cross each other at a right angle as shown in FIG. 3 and FIGS. 4(a), 4(b) and 4(d). The retardation plate 7 is disposed between the first polarizer 5 and the liquid crystal display cell 1 in such a manner that the axes C and D of the retardation plate 7 cross the planes A and B of the polarization of the polarizers at 45°. Needless to say, the above-mentioned directions are relatively determined. Moreover, the linear polarizers 5 and 6 can be mutually exchanged in their positions, and the retardation plate 7 can be alternatively interposed between the liquid crystal display cell 1 and the second polarizer 6.

With such an arrangement, when the natural light is introduced perpendicularly to the second linear polarizer 6, the polarizer 6 develops a linearly polarized light having a plane of polarization in the direction A. The plane of the polarization is rotated 90 degrees when the linearly polarized light passes through the twisted nematic construction area, or, the unactivated area, and the liquid crystal cell 1 develops a linearly polarized light having a plane of polarization in the direction B. When the linearly polarized light passes through the homeotropic construction area, or, the activated area, the plane of the polarization is not rotated.

The linearly polarized light passed through the unactivated area and having the plane of the polarization in the direction B is introduced into the retardation plate 7 and passes through the retardation plate 7 in the form of two linearly polarized light rays having the planes of the polarization in the directions C and D, respectively. Thereafter, the retardation plate 7 develops elliptically polarized light having the phase difference $\delta$ determined by the equation (1). It must be noted that the shape of the elliptically polarized light varies in dependence on the wave length $\lambda$ of the incident light, because the phase difference $\delta$ varies in depending on the wave length $\lambda$ as shown in the equation (1). Thus provided elliptically polarized light is converted into the linearly polarized light having the plane of the polarization in the direction B as it passes through the first linear polarizer 5. Thus developed linearly polarized light has different amplitude, or, intensity in dependence on the wave length, because the shape of the elliptically polarized light varies in dependence on the wave length. Therefore, the finally developed linearly polarized light can be observed as being colored in one color.

The linearly polarized light passed through the activated area and having the plane of the polarization in the direction A is also introduced into the retardation plate 7 and becomes the elliptically polarized light. The shape of the elliptically polarized light varies in dependence on the wave length as in the case for the light passed through the unactivated area. But the directions of the two elliptically polarized light rays of the same wave length cross each other at a right angle. That is, the two elliptically polarized light rays of the same wave length passed respectively through the activated area and the unactivated area have the same index of the ellipse but have the major axes crossing each other at a right angle and have counter directions of rotation to each other. This will be clearly understood when considered with the POINCARE's sphere.

The elliptically polarized light passed through the activated area and the retardation plate 7 is converted into the linearly polarized light having the plane of the polarization in the direction B as it passes through the first linear polarizer 5. Thus obtained linearly polarized light has different amplitude, or, intensity in dependence on the wave length, as in the case for the light passed through the unactivated area, and, therefore, is colored in the complementary color to the light passed through the unactivated area, since the two elliptically polarized light rays of the same wave length cross each other. In this way, the images appear in one color on a complementary color background.

When the operator changes his position with respect to the liquid crystal display of the present invention, that is, when the angle of the light beam to reach operator varies, the images appear in another pair of complementary colors. This is due to the fact that the substantial thickness of the retardation plate 7 and the indexes of the refraction shown in the equation (1) varies as the viewing angle varies and, hence, the phase difference δ varies.

Figure 5:
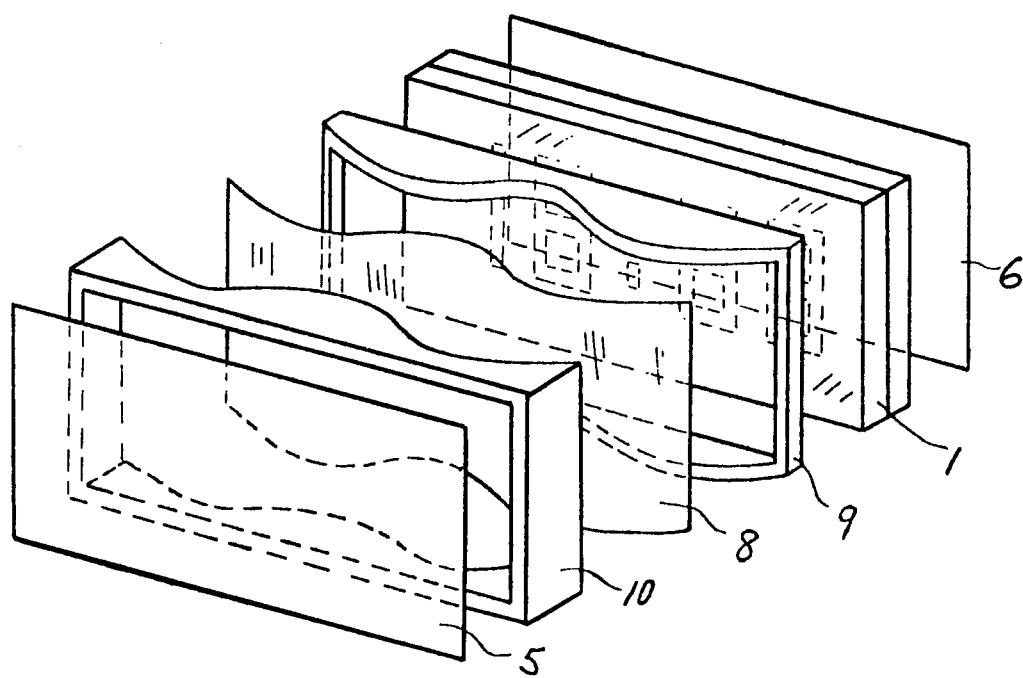
FIG. 5 is an exploded perspective view of another embodiment of a field-effect mode liquid crystal display of the present invention.
Figure 6:
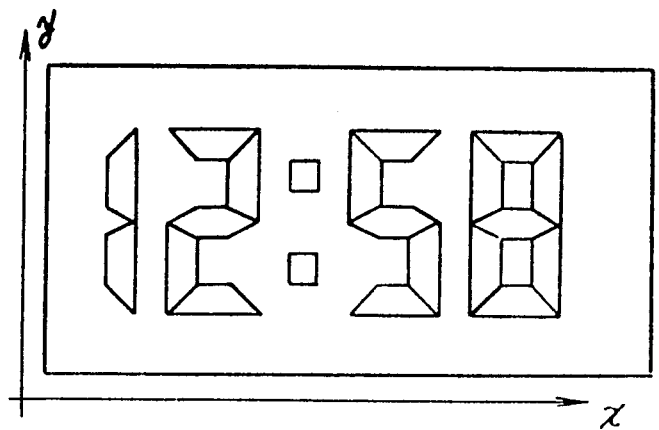
FIG. 6 is a schematic front view of the field-effect mode liquid crystal display of FIG. 5 for the purpose of explaining the operation mode thereof.

FIG. 5 shows another embodiment of the present invention. Like elements corresponding to those of FIG. 2 are indicated by like numerals. The retardation plate 8 is supported by holders 9 and 10 in such a manner to corrugate. In this embodiment, the images appear in different pairs of complementary colors as the image position varies along the X - axis of FIG. 6. This is because the substantial thickness of the retardation plate 8 and the indexes of the refraction vary along the X - axis.

Figure 7:
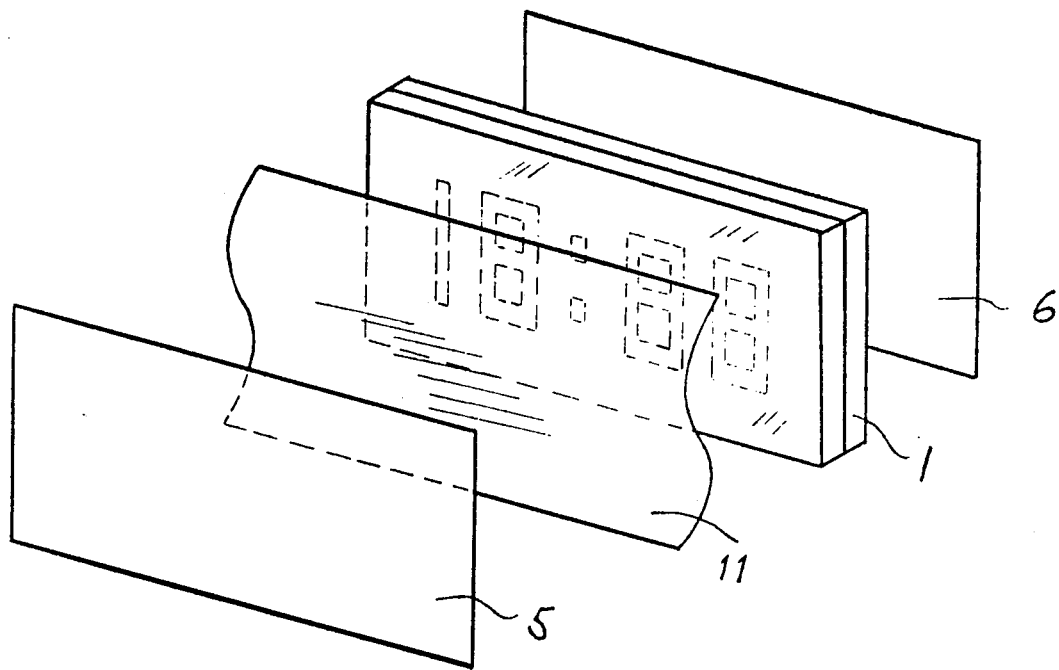
FIG. 7 is an exploded perspective view of still another embodiment of a field-effect mode liquid crystal display of the present invention.

FIG. 7 shows still another embodiment of the present invention. Like elements corresponding to those of FIG. 5 are indicated by like numerals. In this embodiment, the retardation plate 11 is corrugated in the Y direction. Therefore, the images appear in different pairs of complementary colors as the image position varies along the Y - axis of FIG. 6.

The invention being thus described, it will be obvious that the same may be varied in many ways. Such variations are not to be regarded as a departure from the spirit and scope of the invention, and all such modifications are intended to be included within the scope of the following claims.

What is claimed is:

1. In field-effect mode liquid crystal display which comprises a pair of polarizers and a liquid crystal display cell sandwiched between the pair of polarizers, the liquid crystal display cell exhibiting a molecular alignment of a twisted nematic construction when it is unactivated and a molecular alignment of a homeotropic construction when it is activated, the improvement comprising:

a retardation plate disposed between the liquid crystal display cell and one of the polarizers;

said retardation plate being corrugated along a predetermined corrugation axis;

said display cell being traversed by said corrugation axis and providing display images of contrasting colors at different relative positions thereon; and the contrasting colors of said display images being dependent upon the position of said images on said corrugation axis.

2. The field-effect mode liquid crystal display of claim 1, wherein the pair of polarizers are linear polarizers having planes of the polarization crossing each other at a right angle, and the retardation plate determines a pair of crossing planes respective of which cross the planes of the polarization determined by the linear polarizers at 45°.

3. The field-effect mode liquid crystal display of claim 1, wherein the retardation plate creates different phase differences as the wave length of the light passing therethrough varies.

4. The field-effect mode liquid crystal display of claim 1, wherein the retardation plate is made of a biaxially oriented polyester film.

5. The field-effect mode liquid crystal display of claim 1, wherein the retardation plate is made of a biaxially oriented polypropylene film.

6. The field-effect mode liquid crystal display of claim 5, wherein the biaxially oriented polypropylene film has thickness of 20μm to 60μm.

7. The field-effect mode liquid crystal display of claim 5, wherein the biaxially oriented polypropylene film has thickness of about 60μm.

* * * * *